June 11, 1963  A. H. FRÖHLICH ETAL  3,093,531
TIRE BUILDING MACHINE
Filed Jan. 16, 1956   5 Sheets-Sheet 3

INVENTORS
ADOLF FRÖHLICH
BY EDWARD J. HARRIS
ATTORNEY

INVENTORS
ADOLF FRÖHLICH &
BY EDWARD J. HARRIS

ATTORNEY

3,093,531
TIRE BUILDING MACHINE
Adolf H. Fröhlich, Hannover, Germany, and Edward J. Harris, Akron, Ohio, assignors to The Cleveland Trust Company, Cleveland, Ohio, as trustee
Filed Jan. 16, 1956, Ser. No. 559,243
7 Claims. (Cl. 156—400)

This invention relates to the art of pneumatic tire manufacture and in particular, relates to a new and improved type of tire building machine for building up a plurality of fabric plies to a "flat-built" carcass of generally tubular configuration.

In the art of pneumatic tire manfacture, a plurality of fabric plies are successively applied over a cylindrical building drum until a composite cylinder of fabric plies is formed about a building drum. Bead rings are then positioned in an encircling relationship to the axial ends of the build-up cylinder, and the projecting free edges of the built-up fabric plies are then turned over to effectuate "setting" of the bead rings. At this point, breaker and chafer strips, as well as tread stock, are successively applied over the built-up fabric ply, and the result is formation of a tire body of generally cylindrical form. Such tire bodies or carcasses made as above described, are conventionally referred to as "flat-built" or "pulley band" tires, and these tire bodies are subsequently shaped and cured by the use of various types of vulcanizing apparatus in order to produce a finished pneumatic tire.

While the above method of pneumatic tire manufacture has been successfully utilized for the past several years in the art of pneumatic tire manufacture, certain problems have arisen that restrict the utility of such an operation. These problems have arisen primarily as a result of the introduction of certain new types of fabric plies that are characterized by the use therein of extremely stiff and high strength cord members. Such cord members as are now being introduced on the commercial market would preferably be of a light gage wire, with the result that the overall strength of the tire would be materially increased by the use of such cord members in the fabric plies.

However, to date it has been impractical to produce tires on a commercial basis that have wire cords therein, in view of the fact that the inherent stiffness of the fabric ply precludes the turnover operation that is normally manually conducted by the tire builder.

In the known prior art, certain attempts have been made in the past to overcome this difficulty of turning over the fabric ply.

In U.S. Patent 2,440,662, issued April 27, 1948, to L. C. Frazier, there was disclosed an apparatus for building pneumatic tires that employed an inflatable annular band as the transferring agent to effectuate the turnover operation. The operation of this device was predicated upon the use of telescoping members which received therebetween the aforementioned inflatable band, and the axial telescoping of the respective members operated to roll the band so that fabric ply received thereon was transferred to a building drum. U.S. Patents 2,565,071 and 2,653,645, issued respectively on August 21, 1951, and September 29, 1953, to L. C. Frazier, added refinements to the earlier Frazier patent above discussed, and in the main, these improvements consisted of the use of an additional inflatable band interiorly of the drum, with the inflation of the band being operable to expand the peripheral surface of the building drum.

It will be noted that in all of the Frazier patents above referred to, that the turning over of the fabric ply was effectuated by the use of an inflatable band that rolled between telescoping outer and inner surfaces to effectuate the transfer. Such a device is, by virtue of the large number of component parts employed therein, expensive to build; and would additionally be costly to maintain, in view of the relatively short life of the inflatable band members that are employed therein. Additionally, because of the use of an inflatable member between telescoping members, it is entirely possible that either the band or the fabric supported thereon will jam between the telescoping members instead of turning over as theoretically indicated in the patent drawings.

It has been found that improved results in mechanical turning over the edge portions of the fabric ply can be obtained by the use of one or more sets of turning arms positioned adjacent the axial end of an expandable building drum.

Specifically, it has been found that a series of turnover arms are disposed in a circular course that has the axis thereof concentric to the axis of the building drum, that axial shifting of the arms will cause radial expansion and contraction of the free ends, with the result that fabric ply received about the exterior of the circularly arranged arms will be automatically and positively turned over, as a result of such axial movement.

It has been further found that by pivoting these arms at one end thereof so that a fixed diameter is presented, that the free ends can be acted upon by an encircling resilient member to cause an automatic stitching action to occur during the turnover operation.

Additionally, the use of such a simplified construction results in the employment of a positive force that acts to effectuate the turnover action. It has further been found that such an arrangement of component parts eliminates the necessity for a transfer band of the type employed in the Frazier teachings, with the result that an improved machine of simplified construction and efficient operation will be provided.

It accordingly becomes one object of this invention to provide an apparatus for building uncured tire bodies characterized by the presence of turnover means operable against the underside of positioned fabric plies to positively cause the same to be turned over for engagement with respect to a central or medial portion of a fabric ply that has been positioned about a building drum.

It is a further object of this invention to provide a tire building drum that has the extreme diameter thereof extendable between a plurality of radial dimensions by the use of automatic mechanisms that move axially thereof.

It is a still further object of this invention to provide a tire building machine of the character described that is characterized by the presence of a building drum capable of being encircled by a plurality of pivotable fingers arranged in a circular course and which are shiftable axially thereof.

These and other objects of the invention will become more apparent upon a reading of the following brief specification, considered and interpreted in the light of the accompanying drawings.

Referring now to the drawings, and in particular to FIGURES 1 through 8 thereof, it will be seen that the improved tire building machine, generally indicated by the numeral 10, includes a base support 11 that houses drive and fluid supply means 12 and 13, respectively so that a rotatable building unit 14 can be rotated about its axis as a result of a central shaft 30 being rotatably carried by the base support 11, as will be hereinafter described.

In order that the detailed description of the invention might be more fully understood, the above listed component parts will be separately considered, as will the overall operation of the building machine 10.

Description of the Base Support

Figure 1:
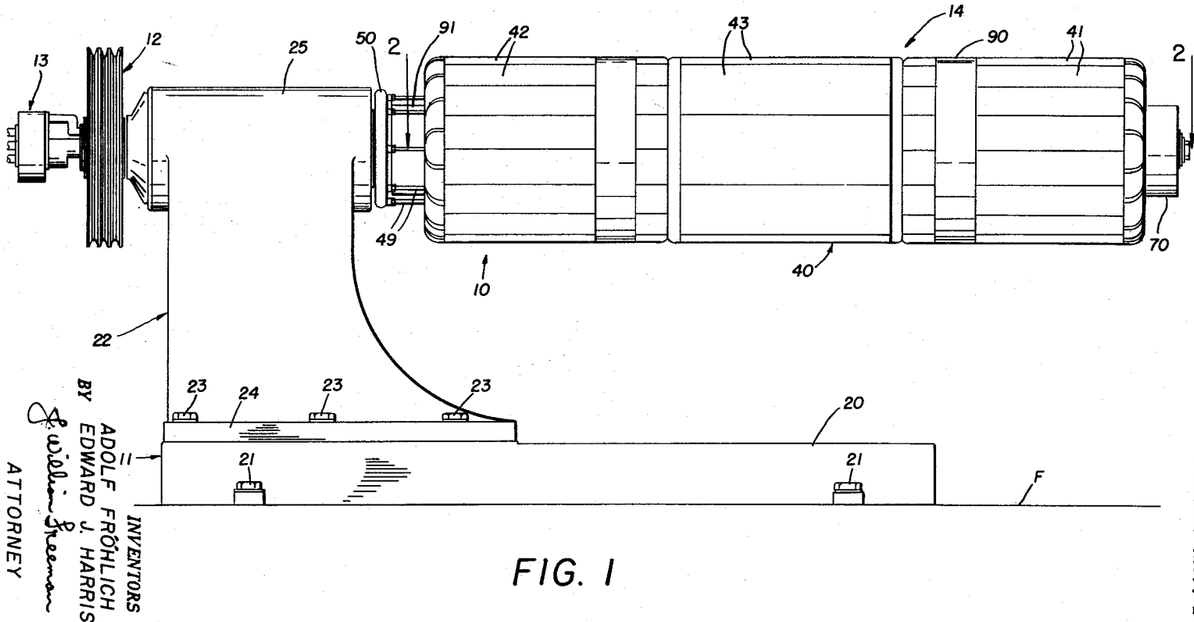
FIGURE 1 is a side elevation of the improved tire building machine.
Figure 2:
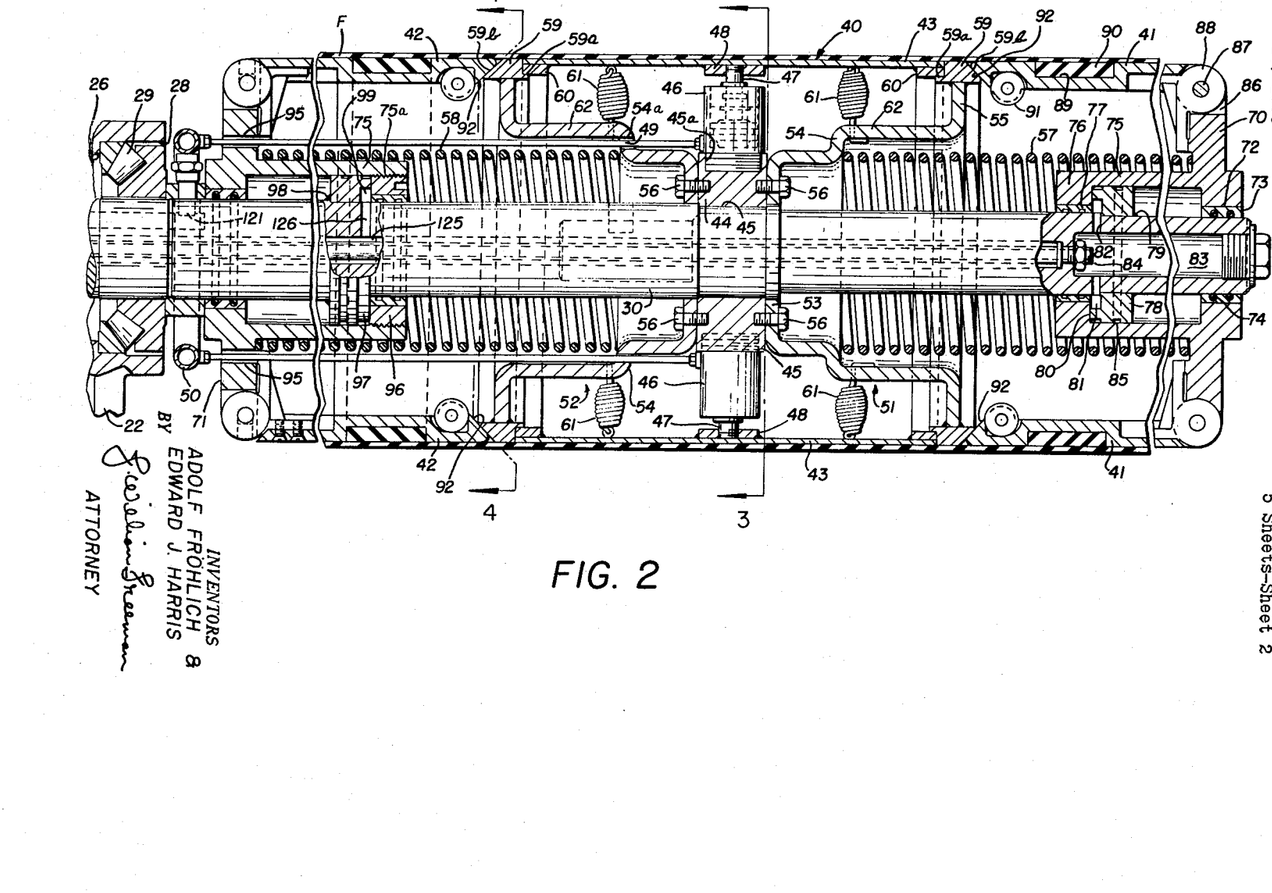
FIGURE 2 is a section taken on the lines 2—2 of FIGURE 1.
Figures 3, 4, 5:
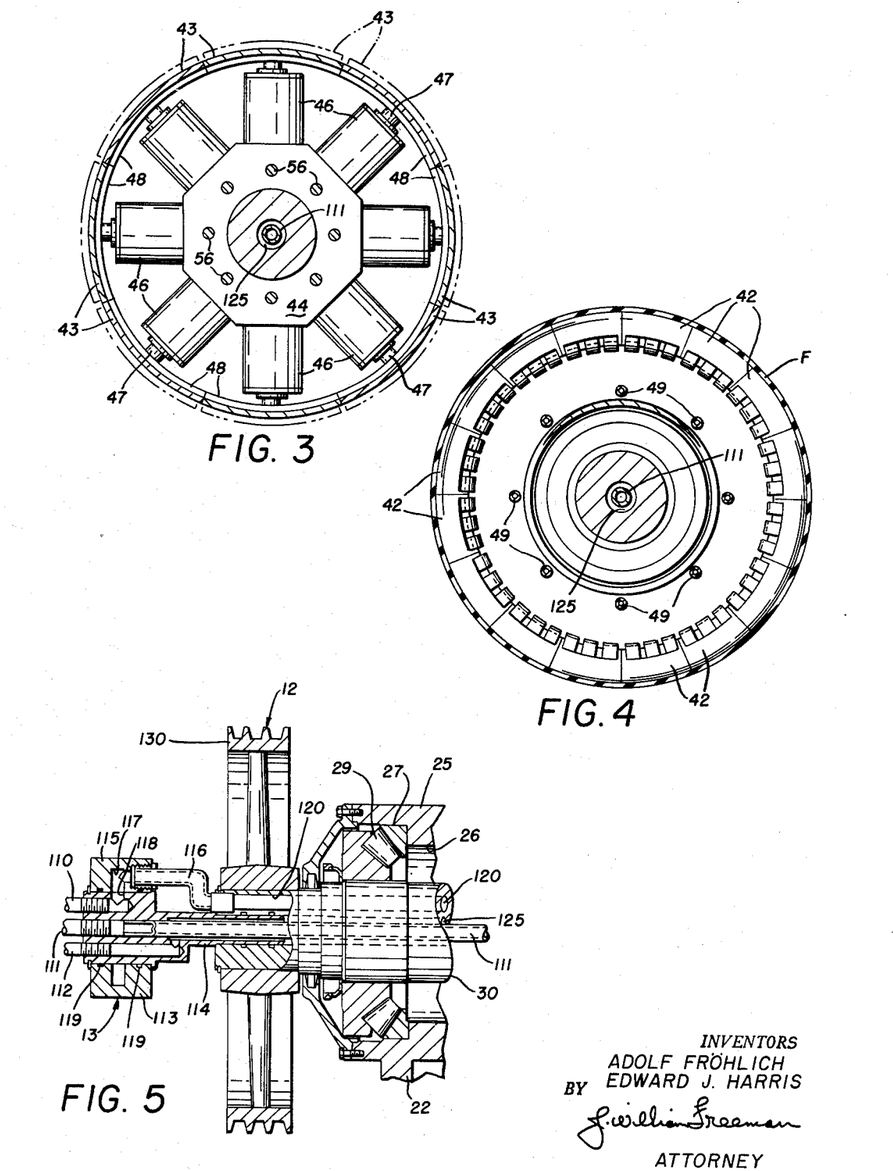
FIGURES 3 and 4 are sectional views taken on the lines 3—3 and 4—4 of FIGURE 2.
FIGURE 5 is a sectional view showing the drive and fluid supply mechanisms of the improved tire machine.

As is best shown in FIGURE 1 of the drawings, the base support 11 essentially comprises a base member 20 that is secured to floor F by bolts 21, 21 so as to support at one end thereof an upright standard that is generally designated by the numeral 22. As before, bolts 23, 23 are employed to secure the flange 24 of standard 22 is shown in the drawings as being formed in a hollow cylindrical shape so as to define, as illustrated in FIGURES 2 and 3, a cylindrical inner wall surface 26 that is stepped, as at 27, 28 to accommodate the usual thrust bearings 29, 29 that coact with a central shaft 30 to cause the same to be rotatably supported about the axis of the cylindrical wall surface 26. In this manner, the drive means 12, the fluid supply means 13 and the building unit 14, all of which are secured to shaft 30 as will be described, will rotate in unison with respect to the upper portion 25, with the axis of the shaft 30 being concentric with the axis of the cylindrical surface 26.

Description of the Building Unit

As indicated above, building unit 14 is secured with respect to shaft 30 and rotates therewith relatively with the base support 11 to thus permit fabric ply F (see FIGURE 2) to be applied over the external surface thereof.

In practice, the building unit 10 is defined by a central building drum 40 that is acted upon by two series of turnover arms 41, 41 and 42, 42 that are arranged, as shown in FIGURE 4 of the drawings, in a circular course about the axis of rotation of the shaft 30; and in this manner, the two sets of turnover arms rotate with the drum 40 upon turning of the shaft 30.

Considering first the detail structure of the drum 40, it will be seen that the same has the outer peripheral surface thereof defined by a plurality of elongated staves 43, 43 that abut at their longitudinal edge portions to define a closed circular course that defines a substantially uninterrupted outer peripheral surface, upon which the fabric ply F may be applied when the same are in the contracted position of FIGURE 2.

The stave members 43, 43 are radially spaced from the axis of the shaft 30 by the use of a ring member 44 that is mounted upon a reduced portion 45 of shaft 30 so as to be rotatable therewith. The outer peripheral surface of the ring member 44 is provided with a plurality of tapped apertures 45a, 45a, within which is received one end of hydraulic pistons 46, 46; the arrangement being such that the actuating end 47 of each piston 46 can be secured to the individual staves 43 through the use of a mounting block 48, which is preferably shown welded to the outside of the staves 43. In practice, eight such pistons 46, 46 are shown in the drawings as being connected to eight stave members 43, 43 so that these stave members may be moved between the full and chain-dotted line positions of FIGURE 3 of the drawings. It suffices at this time to note that each piston 46 has pressurized fluid supplied thereto through conduits 49, 49, with the individual conduits 49, 49 being supplied from a central source 50 as will be presently described.

In addition to the aforementioned component parts, the ring member 44 has secured to the opposed axial faces thereof, a pair of bell-shaped sleeve members generally designated by the numerals 51 and 52 as shown in FIGURE 2 of the drawings. These sleeve members 51 and 52 each have radial flanges 53, 54 and 55, with bolt 56 securing each radial flange 53 to the ring member 44, while the radial flanges 54, 54 serve as seats for springs 57, 58, as will presently be described. By like token, the radial flanges 55, 55 carry peripheral rings 59, 59 that are notched as at 59a, 59a to provide a seat for block members 60, 60 that are secured to the underside of the stave members 43, 43 at their opposed axial ends. In addition to the notched portions 59a, 59a, each ring member 59 has an inclined surface 59b that coacts with the individual arms 41, 41 and 42, 42, in a manner to be described.

In order that the stave members 43, 43 may be retracted to the position shown in FIGURE 2 upon exhausting of the pressure in pistons 46, 46, each stave member 43 is interconnected with respect to the bell-shaped sleeve members 51 and 52 by the use of spring members 61, 61, each of which has its opposite end secured respectively to the stave 43 and an axially extending portion 62 of the bell-shaped sleeves 51 and 52. In order that the previously described conduit 49 may be passed axially of the tire building unit 10, the radial flange 54 of the bell-shaped sleeve 52 further includes apertures 54a, 54a therein that permits the conduit member 49, to be passed therethrough.

Turning next to a consideration of the turnover arms per se, it will be first noted that the construction of these respective sets of arms 41, 41 and 42, 42 is substantially identical to each other, with the exception that the arms 42, 42 are opposite-hand to arms 41, 41 (see FIGURE 2). Accordingly, the arm members 41, 41 will be first described in detail, while the arms 42, 42 will be described only insofar as the same relate to positioning or a different portion of the shaft member 30.

To this end, both sets of arms 41, 41 and 42, 42 are pivotally mounted about support rings 70, 71, respectively; and as shown in FIGURE 2 of the drawings, the support ring 70 includes a centrally apertured portion 72 that receives a sealing member 73 therein. This sealing ring 73 has the usual O-rings 74, 74 provided in the inner periphery thereof for engagement with the exterior portion of the shaft 30. In this manner, the entire support ring 70 can move axially of the shaft 30 upon energization of the fluid means, in a manner to be described. In this regard, it will be noted that the support ring 70 additionally includes an axially extending cylindrical portion 75 that projects inwardly towards the central portion of the building unit 10 which terminates in an inwardly presented flange 76 that is rotatably sealed with respect to the shaft 30 by the use of a sealing ring 77. A key way (not shown) provides the necessary driving connection between the ring 70 and the shaft 30 to cause these members to rotate in unison. In addition, the shaft 30 has a ring member 78 welded thereto as at 79 so that an axially extending flange 80 thereof is capable of coaction with the inwardly turned flange 76 to define an expandable chamber indicated generally by the numeral 81. Pressurized fluid is supplied to this chamber 81 through aperture 82 that is provided in shaft 30, as shown at the righthand portion of the drawings in FIGURE 2. In this regard, the arrangement is such that an inner bore 83 is provided at the extreme right axial end of the shaft 30 for this purpose, with fluid being supplied to this bore 83 through pipe 84, as will be described. The usual O-ring 85 is provided in the ring member 78 for coaction with the cylindrical extension 75 to effectuate the required sealing therebetween.

To the end of receiving the individual arms 41, 41 in pivotal relationship to the ring 70, the same (ring 70) is shown having the outer peripheral edge portions thereof slotted as at 86, 86 so as to provide a support for pin 87, about which one axial end 88 of the individual arms 41 may be mounted.

Figure 6:
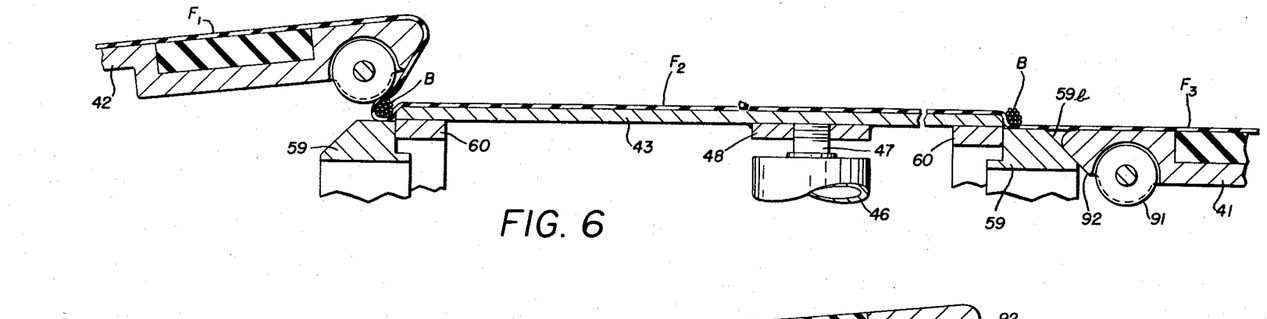
FIGURES 6, 7 and 8 are schematic views illustrating the position of the component parts during various stages of the building operation.
Figure 7:
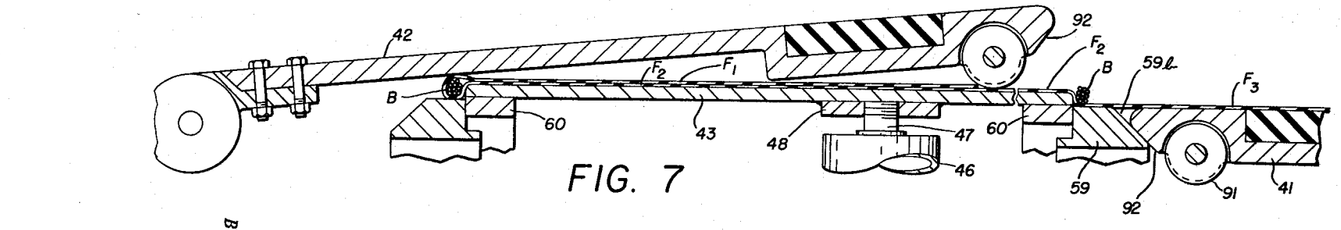
Figure 8:
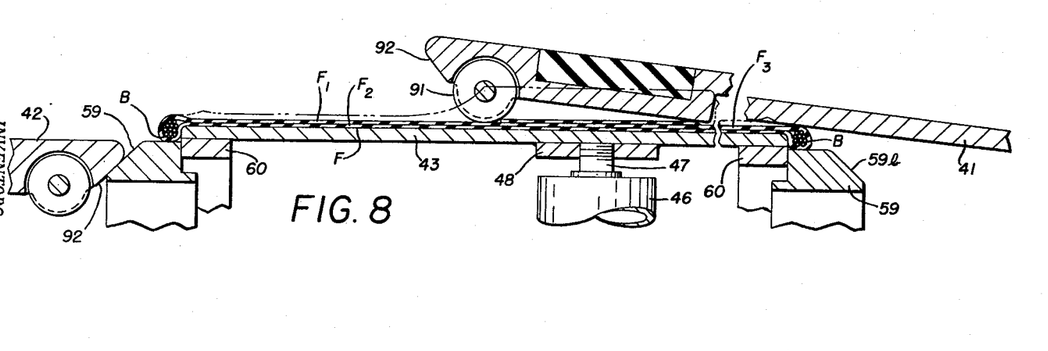

While the individual arms 41, 41 are generally elongated configuration, so as to extend axially of the building unit 10, the same have the top surface thereof provided with an undercut 89 within which an endless resilient band 90 may be positioned so as to encircle the circular course of arms 41, 41, for purposes to be described. Similarly, a series of rollers 91, 91 are provided at the opposite axial ends of the individual arms 41, 41, for the purpose of stitching down the turned-over fabric ply when the arms 41, 41 have been first axially positioned as shown in FIGURES 6, 7 and 8 of the drawings. It is to be understood that the additional sets of rollers (not shown) could be included at an axially spaced point on the arms 41, 41 for the purpose of providing friction-free turn up of the fabric ply. Likewise, the extreme inboard axial end of each arm 41 is provided with a tapered surface 92 that coacts with the previously discussed surface 59b of ring 59.

With regard now to the construction of the individual arms 42, 42, it will be noted that the same are similarly mounted about ring members 71, and substantial variation of ring 71 with respect to previously described ring 70 occurs in the presence of apertures 95, 95 therein that are provided for the purpose of permitting passage therethrough of conduits 49, 49 that lead to pistons 46, 46. A second variation of the construction of the ring member 71 exists with respect to the fact that the same (ring 71) has the inboard axial end of the cylindrical portion 75 threaded interiorly as at 75a so as to permit reception of sealing block 96 that will coact with a ring member 97 that is secured to shaft 30 as by weld 98. In this regard, it is to be noted that the ring members 96 and 97 define with shaft 30 an expandable chamber 99, with fluid entrance to such chamber being provided for by conduit 126.

*Description of Drive and Fluid Supply Means*

It has previously been set forth that fluid pressure is required at three points in the building drum, and to the end of effectuating such a supply of fluid pressure, the various conduits and the fluid supply feature will now be discussed in greater detail.

As is best shown in FIGURE 5 of the drawings, fluid is introduced to the building machine through three supply pipes 110, 111, and 112 that lead to a fixed block member 113; the arrangement being such that a reduced diameter extension 114 of the block member 113 extends inwardly of the center of the shaft 30 and is rotatable therewith. Positioned around the block member 113 in encircling relationship therewith, is a second ring-type member 115 that rotates with the shaft, as a result of the connection thereto through pipe member 116. To the end of transferring fluid from pipe 110 to pipe 116, the outer ring member 115 has a radial groove 117 provided therein that overlies an opening 118 provided in the block member 113. In this manner, fluid entering the conduit 110 under pressure emits into the radial undercut 117 through opening 118 with seals 119, 119 obviating leakage as the fluid is transferred to the rotating pipe 116 from whence it may enter a conduit 120 that is provided interiorly of the shaft 30. As shown in breakaway in FIGURE 2 of the drawings, the conduit 120 communicates with an opening 121 that leads to the supply ring 50 from whence it may be dispersed into the individual conduits 49, 49 for actuation of the pistons 46, 46 in known manner.

The supply pipe 111, by way of contrast, is disposed upon the axis of the rotating shaft 30, and extends axially the length of the shaft 30 so that the end 84 thereof projects into cylindrical bore 83 to supply fluid under pressure, to chamber 81.

By like token, the supply line 112 serves as a source of fluid pressure for the chamber 99, and to this end the fluid from the pipe 112 is shown entering an internal bore 125 of the shaft 30; the arrangement being such that an annular space is provided between the bore 125 and the conduit 111 to permit the passage of fluid. This annular chamber terminates in a bore 126 that extends radially through the body of the shaft 30 for communication with the annular chamber 99.

With respect to the specific construction of the drive means 12, the preferred form of the invention shown herein merely contemplates the use of a sheave 130 that is keyed to a reduced portion of shaft 30 so as to be rotatable therewith. In this manner, rotation of sheave 130 by use of a pulley or other known means, will result in rotation of the shaft 30, with the result that the building unit 10 will also be rotated therewith as has been previously described.

*Operation of Tire Building Machine*

In use or operation of the improved tire building machine illustrated in FIGURES 1 through 8 of the drawings, it will first be assumed that the component parts are positioned as shown in FIGURES 1 and 2 of the drawings, with the stave members 43, 43 being contracted as shown in FIGURE 2, so that these staves 43, 43 together with the ring members 59, 59 and the individual arms 41, 41 and 42, 42 define a substantially uninterrupted cylindrical exterior surface.

With the parts thus positioned, a fabric ply F may be positioned over the drum, and as shown in FIGURE 2, the fabric ply F will overlie portions of the arm members 41, 41 and 42, 42, as well as the circularly arranged stave members 43, 43 and ring members 59, 59.

At this time, bead members B, B may be positioned over the fabric ply F adjacent the point of juncture of each ring 59, with the stave member 43. Such bead members may be tightened in known manner so that the same may be firmly retained against the axial ends of the staves 43, 43 as shown in FIGURE 6 of the drawings. For the sake of clarity, it will be considered that the bead rings B, B operate to divide the ply F into three sections; namely, a central or medial portion designated as $F_2$ and falling between beads B, B, and two edge portions $F_1$ and $F_3$, each being defined by one bead ring B and a longitudinal edge of fabric ply F.

When the beads have been set as just described, the turnover operation may be commenced, and as shown in FIGURE 6, the arms 42, 42 may first be moved in unison to the right of FIGURES 2 and 6 by introducing fluid pressure into the line 112 for entrance to chamber 99 through opening 126 as has been described. The result of the entrance of such pressure into the chamber 99 will be that the member 96 will be moved to the right as a result of such pressure, so that the entire ring assembly 71 will be moved to the right as a result of the threaded connection 75a (see FIGURE 2). This movement to the right will overcome the force of the spring 58 and will operate to compress the same during the time that the ring assembly 71 is moving to the right of FIGURE 2.

It is apparent that during such movement to the right that the inclined surface 92 of each arm 42 will slide against the correspondingly tapered surface 59b that is provided on the ring member 59. The effect of such sliding contact between the members 59 and 42 will be that the inboard end of the individual arms 42, 42 will be radially expanded as shown in FIGURE 6 of the drawings. As such radial expansion of these inboard ends continues, it is apparent that the wheels 91, 91 will engage the fabric F as shown in FIGURE 6, and at the point of contact illustrated in FIGURE 6 these wheels are operating to stitch the fabric F with respect to the position of the beads B, B. As the movement to the right of the ring assembly 71 continues, it is believed further apparent that the inboard end of each arm 42, 42 will approach the position of FIGURE 7, at which time the entire edge portion $F_1$ of fabric ply F will have been turned over the bead B and applied against the central or medial portion of $F_2$ of the fabric ply F. During such turning over operation, it is apparent that the wheels 91, 91 will have rolled over the turned-over fabric $F_1$, with the result that the stitching will have been effectuated between the fabric portions $F_1$ and $F_2$, respectively. It is also to be noted that during the aforementioned axial movement of the arms 42, 42, that the resilient endless bands 90 will have operated to urge the inboard ends radially inwardly, with the result that a high degree of stitching pressure will have been exerted by the wheel members 91, 91.

When the arms 42, 42 have reached the position of FIGURE 7, it is apparent that the edge portion $F_1$ will have been fully turned over and the bead B enclosed therein as shown. At this time, the axial length of the chamber 99 will have been extended considerably and the device may be returned to the position of FIGURE 2 by merely permitting the exhaust of pressurized fluid from the chamber 99, at which time the spring 58 will urge the entire ring assembly 71 to return to the position of FIGURE 2.

At this point, edge portion $F_1$ has been stitched to the central or medial portion $F_2$. To cause the right hand edge portion $F_3$ of fabric ply F to be folded over the positioned bead B shown at the right of FIGURE 2, it is merely necessary that fluid pressure be introduced through conduit 111 for subsequent emission into cylindrical bore 83. Introduction of pressure into bore 83 will cause a substantial increase in the pressure interiorly of the annular chamber 81, with the result that the inturned flange portion 76, together with sealing member 77 will be moved to the left of FIGURE 2, in view of the stationary connection between the ring 78 and the shaft 30 as effectuated by the weld 79. As such pressure increases and the entire ring assembly 70 moves to the left, it is apparent that surfaces 92, 92 of the individual arms 41, 41 will move across the opposed inclined surface 59b of ring 59, to cause an increase of the radial dimension of the inboard ends of the circularly arranged turnover arms 41, 41.

Continuation of movement to the left (see FIGURE 2) of the individual arms 41, 41 will cause the wheels 91, 91 to engage the underside of the edge portion $F_3$, with the result that the same will be automatically folded around the bead portion $B_1$ and the edge portion $F_3$ will be firmly stitched thereto as illustrated in FIGURE 8. Continuation of the movement to the left of the arms 41, 41 will further result in the entire edge portion $F_3$ being stitched to the medial or central portion $F_2$, as well as the previously turned-over edge portion $F_1$ as shown in FIGURE 8. Once again, when the edge portion $F_3$ has been folded over as just described, it is apparent that the individual arms 41, 41 can be moved to the right of FIGURES 2 and 8, as the result of the termination of pressure in the axially extended chamber 81, which cessation of pressure will result in spring 57 moving the ring assembly to the position shown in FIGURE 2 of the drawings.

At this time, a fabric ply has been completely applied about the building drum 40, and if desired, a tread stock can be added thereto by merely causing rotation of the drum through rotation of sheave member 130 in known manner.

With the fabric ply F having been applied as just described, the pistons 46, 46 may be expanded in unison, as a result of fluid pressure being supplied thereto through the conduits 49, 49, a suitable valve for this purpose being provided in line 110, for example. When the individual staves 43, 43 have been expanded as just described, the external diameter of the circular course of the same is slightly greater than the diameter of the abutting rings 59, 59, with the result that a slight radial shoulder will be presented at the axial end of each stave 43.

At such time as all of the component parts have been assembled and expanded as just described, the pressure in lines 49, 49 may be terminated, with the result that springs 61, 61 will operate to return the individual staves 43, 43 to the position of FIGURE 2. It is apparent at this point that the decreased diameter of the building drum 40 will permit the low shouldered tire to be merely slipped off as a result of axial movement thereof, in view of the fact that the retracted diameter of the building drum 40 and the arms 41, 41 and 42, 42 is less than the internal bead diameter of the "flat-built" tire.

When the tire has been completed as just described, it is apparent that additional fabric may be added for repetition of the above cycle.

It is to be noted that when the component parts are returned to the position shown in FIGURE 2 that radially inward movement of the individual arms is restricted, as the result of the complemental engagement between the surfaces 59b and 92. It is also to be noted that the axial movement to the left of this ring member 71 is limited by block 131, while the cylindrical ring portion 80 limits the movement to the right of the ring member 70.

It is also to be noted that in the preceding description that the expansion of the diameter of the staves 43, 43 follows the folding-over of the edge portions $F_1$ and $F_2$. It is to be understood that this procedure of operation could be reversed, with the staves 43, 43 first being expanded, at which time the sets of arms 41, 41 and 42, 42 could be shifted axially to effectuate the turnover. It is also apparent that the operation could be conducted by partially expanding the staves 43, 43, followed by partial axial movement of the sets of arms 41, 41 and 42, 42, or vice versa. This reversal or variation in operation of the machine can be varied to the individual requirements needed.

Figures 9, 11:
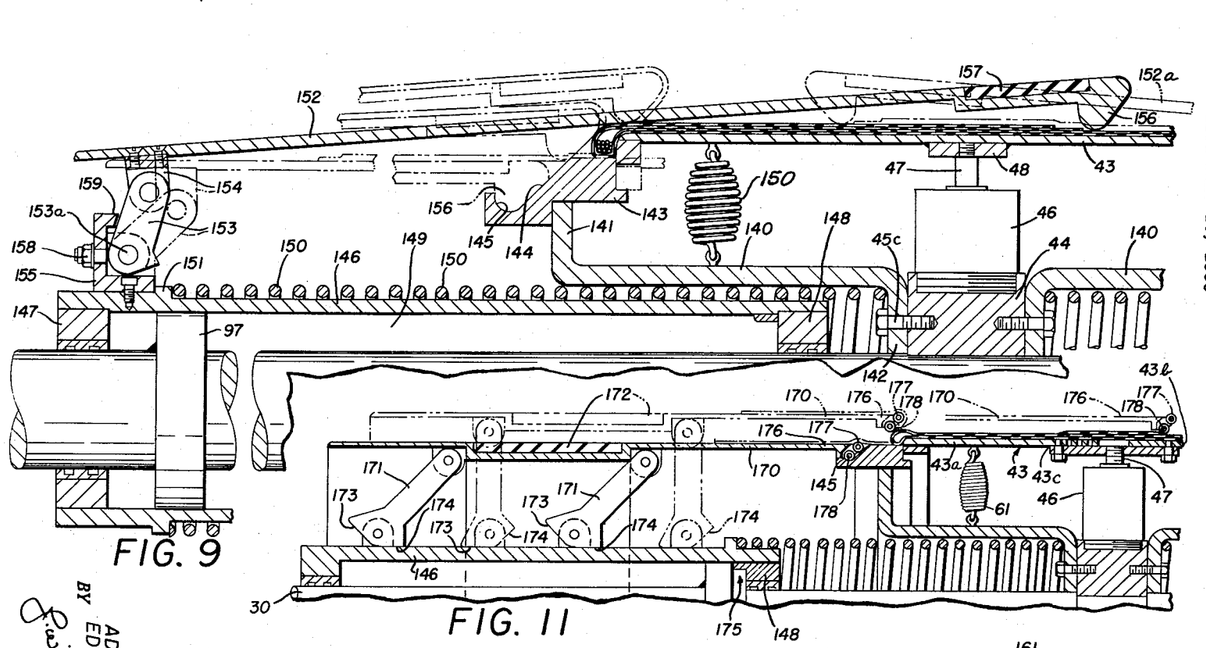
FIGURES 9 and 10 and 11 are schematic views illustrating modified forms of the invention and include in full and chain-dotted lines, various positions of the component parts during the operation of the modified form shown therein.
Figure 10:
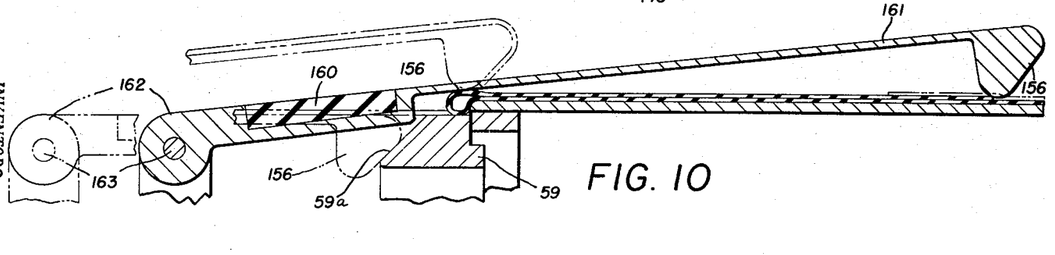

In the modified form of the invention shown in FIGURES 9 through 11 of the drawings, the principle of operation disclosed is substantially the same, with the exception that the construction and actuation of the individual turnover arms is somewhat varied. Accordingly, where indicated, like numerals designate like parts.

In the modified form of the invention shown in FIGURE 9 of the drawings, a plurality of stave members 43, 43 are mounted as before on the movable ends of hydraulic piston members 46, 46 which are in turn mounted on a fixed central ring 44. Secured to the opposed faces of the ring member 44 by bolts 45c, 45c are sleeve members 140, 140 that have their axial ends defined by radial flanges 141, 141. Mounted upon the external periphery of the flange 141 is a retaining block 143 that has an inclined surface 144 terminating in a pocket 145. Telescopically received within the sleeve members 140, 140 are tubular members 146, 146, each of which is provided with axial end walls 147, 148 that surround the shaft 30 in axially shiftable relationship therewith. Ring member 97 of FIGURE 9 permits pressurized fluid to be introduced into annular cavity 149 for the purpose of forcing the end wall 148 to the full line position of FIGURE 9, while spring 150, operating between radial flange 142 and radial shoulder 151 will operate to return the sleeve 146 to the left of FIGURE 9 upon cessation of pressure within the chamber 149.

The arm members 152, 152 of the modified form of the invention shown in FIGURE 9 are shown mounted with respect to the sleeve 146 through the use of a pivotal link member 153 that interconnects at its opposed ends with lugs 154 and 155 which are respectively secured to the arms 152 and the sleeve 146. An enlarged head portion 156 provided on the inboard end of the arm 152 serves as a stitching member when the device is moved between the chain-dotted and full line positions of FIGURE 9; and it is to be noted that the arms 152, 152 are encircled by a resilient endless band 157 that is mounted adjacent the inboard ends thereof. Adjustment of the arcuate path of travel of the link member 153 about pivot point 153a is shown controlled by the use of a screw member 158, as well as an inturned flange 159.

The operation of the modified form of the invention shown in FIGURE 9 of the drawings is similar to that previously discussed in connection with FIGURES 1 through 8. Accordingly, the end wall 148 may be moved to the right towards the position of FIGURE 9 as the result of introduction of fluid pressure into chamber 149. Such movement of wall 148 will cause the arms 152, 152 to move to the right in the pattern indicated by the chain-dotted lines to the point where the same assume the position shown in full lines in FIGURE 9. During such movement the link member 153 will move from the chain-dotted to the full line position thereof to thus permit the arms 152, 152 to "float" during the axial movement that has just been described. Return of the arms 152, 152 to the extreme left position indicated in chain-dotted lines in FIGURE 9 is facilitated by the use of the spring 150 when the chamber 149 has been evacuated. It is believed apparent that a similar set of arms 152a, 152a, shown in chain-dotted lines are provided on the right-hand side of the center ring 44, and that operation of these arms to the chain-dotted line position of FIGURE 9 could be carried out in equivalent manner.

The modified form of the invention shown in FIGURE 10 of the drawings is similar in many respects to the form of the invention shown in FIGURES 1 through 9 of the drawings, with two salient exceptions.

First, it will be noted that the resilient band 160 is mounted closer to the outboard ends of the individual arms 161, 161, and secondly, it will be noted that the extreme outboard ends 162, 162 of arms 161, 161 are mounted around a fixed pivot point 163 that would normally be carried by the sleeve 146 as shown in FIGURE 9.

The operation of the device would be similar to that above described in FIGURE 9; and in this form of the invention it is to be noted that the ring member 59 could be provided with a pocket similar to the pocket 145 as shown in the modification of FIGURE 9.

Considering next the modified form of the invention shown in FIGURE 11 of the drawings, it will be noted that the arms 170, 170 thereof that are provided in this form of the invention, are maintained in a condition of parallelism about the axis of the central shaft 30 as a result of the use of pantograph links 171, 171 that interconnect the arms 170, 170 with a sleeve 146 of the type employed in the FIGURE 9 modification.

An endless resilient band 172 operates to maintain the proper degree of tension at all times during the axial movement of the arm members 170, 170, and a positive locking action in this regard is obtained by the use of cam surfaces 173, 174 that are provided on the individual link members 171, 171. In this manner, the surfaces 174, 174 will be in contact with the external surface of sleeve 146 when the parts are positioned as shown in full lines in FIGURE 11, and when the sleeve 146 has been moved to the right by the introduction of pressurized fluid into the chamber 175 in known manner, the links 171, 171 will rock about their respective pivot points so that the surface 173 thereof will be in contact with the external surface of sleeve 146 when the parts have assumed the chain-dotted line position of FIGURE 11 of the drawings. As before, piston 46 operates to radially expand the stave 43, while spring 61 causes return of these members upon the termination of pressure by the piston 46. In a manner similar to that previously suggested the individual arms 170, 170 have enlarged heads 176, 176 that further individually include rollers 177, 178 that aid in turning over the fabric ply.

Additionally, the staves 43, 43 are shown modified in FIGURE 11 so as to be individually divided into segments 43a, 43b that are relatively movable of each other as at 43c so that the length of staves 43, 43 may be varied.

It is believed apparent that the operation of this modified form of the invention will be initiated by the entrance of pressurized fluid into chamber 175 which will cause the end wall 148 to move to the right of FIGURE 11 so that the link members 171, 171 will assume the chain-dotted line position of FIGURE 11, with the result that continuation of axial movement thereof will result in the fabric ply being turned over as shown in the drawings:

It is to be understood that in connection with this modified form of the invention that a similar set of arms would be provided to the right of the circularly arranged piston members 46, 46, and would operate in substantial manner to fold over the remaining edge portion of the fabric ply.

In the preceding paragraphs there has been described a new and novel type of tire building machine that utilizes the coaction between a radially expandable building drum and axially shiftable turnover arms to effectively turn over the overlying portions of the fabric ply that are presented adjacent the applied bead rings. It has been shown how the use of this machine permits the use of a relatively long turnover of fabric ply, and how the machine is further advantageous in that the fabric ply that is turned over is firmly and uniformly stitched to the overlying central portion received on the building drum between the applied bead rings.

It has been further shown how the positive action of the inboard ends of the individual turnover arms, acting directly against the under surface of the fabric ply permits a positive and sure turnover operation to occur. This positive drive feature of the invention eliminates the necessity for additional transferring devices in the nature of inflatable bags of the type taught in the above-discussed Frazier patents.

It will be noted that in the preceding paragraphs certain specific designations have been made as to composition and shape. It is to be understood that the scope of this invention is not limited by such specific recitations which are made for the sake of clarity of description. Thus, alteration of the shape of the turnover arms, for example, without the achievement of new result, is intended to fall within the teachings of this invention which are limited only by the extent of the appended claims.

It accordingly follows that additional modifications of the invention may be resorted to without departing from the spirit hereof or the scope of the appended claims.

What is claimed is:

1. A tire building machine of the character described, comprising; a base member; an elongate support shaft secured to said base member; a building drum disposed medianally of said support shaft; a first ring member received around said support shaft in axially shiftable relationship therewith; a second ring member received around said support shaft in axially shiftable relationship therewith at an axial distance from said first ring; a first series of elongated arms, each having one end thereof pivotally mounted with respect to said first ring, with said pivoted ends thereof being arranged in a circular course of variable dimension; a second series of elongated arms, each having one end thereof being pivotally mounted with respect to said second ring, with said free ends of said second series of arms being arranged in a circular course of variable dimension; a pair of guide rings disposed adjacent the opposed axial ends of said drum in substantially abutting relationship therewith and being respectively engaged by the free ends of said first and second series of elongate arms during the period that said first and second rings are located in a condition of maximum axial separation with respect to each other; means for radially expanding the free ends of said first series of arms into encircling relationship with said drum upon axial shifting of said first ring; means for radially expanding the free ends of said second series of arms into encircling relationship with said drum upon axial shifting of said second ring; and means for alternately reciprocating said first and second rings; said guide rings being fixed with respect to said support shaft.

2. A tire building device of the character described, comprising; a base; a shaft carried by said base; a building drum carried by said shaft and having opposed axial ends; at least one guide ring supported by said shaft in concentricity with said drum and being disposed in coextensive abutment with said axial end of said drum in substantially fixed relationship with said shaft; at least one support ring supported by said shaft in concentricity with said drum and being shiftable axially of said drum between a position of adjacency with said guide ring and a position of maximum separation from said guide ring; a plurality of elongate arms each having one end thereof pivotally secured to said support ring and each having the opposed free ends engaging said guide ring when said support ring is in said position of maximum separation from said guide ring; said guide ring having an inclined surface thereon that is complemental to an inclined surface provided on the free ends of said arms that engage the same; said inclined surfaces coacting to urge the free ends of said arms radially outwardly during movement of said support ring towards said guide ring.

3. A tire building device of the character described, comprising; a base; a shaft carried by said base; a building drum carried by said shaft and having opposed axial ends; at least one guide ring supported by said shaft in concentricity with said drum and being disposed in coextensive abutment with said axial end of said drum in substantially fixed relationship with said shaft; at least one support ring supported by said shaft in concentricity with said drum and being shiftable axially of said drum between a position of adjacency with said guide ring and a position of maximum separation from said guide ring; a plurality of elongate arms each having one end thereof pivotally secured to said support ring and each having the opposed free ends engaging said guide ring when said support ring is in said position of maximum separation from said guide ring; and cam means defined by said guide ring and urging the free ends of said arms radially outwardly during movement of said support ring towards said guide ring.

4. The device of claim 3 further characterized by the presence of means that urge the free ends of said arms radially inwardly towards engagement with said guide ring.

5. The device of claim 4 further characterized by the fact that said last mentioned means include a resilient band encircling said arms under tension.

6. A tire building device of the character described, comprising; a base; a shaft carried by said base; a building drum carried by said shaft and having opposed axial ends; at least one guide ring supported by said shaft in concentricity with said drum and being disposed in coextensive abutment with said axial end of said drum in substantially fixed relationship with said shaft; at least one support ring supported by said shaft in concentricity with said drum and being shiftable axially of said drum between a position of adjacency with said guide ring and a position of maximum separation from said guide ring; a plurality of elongate arms each having one end thereof pivotally secured to said support ring and each having the opposed free ends engaging said guide ring when said support ring is in said position of maximum separation from said guide ring; said arms having longitudinal surfaces that are disposed in longitudinal alignment with the external surfaces of said guide ring and said drum during the period that said support ring is in said position of maximum separation from said guide ring, whereby said longitudinal surfaces may serve as ply receiving surfaces that are substantially contiguous to the external ply receiving surfaces of said guide ring and said drum.

7. A tire building device of the character described, comprising; a base; a shaft carried by said base; a building drum carried by said shaft and having opposed axial ends; at least one guide ring supported by said shaft in concentricity with said drum and being disposed in coextensive abutment with axial end of said drum in substantially fixed relationship with said shaft; at least one support ring supported by said shaft in concentricity with said drum and being shiftable axially of said drum between a position of adjacency with said guide ring and a position of maximum separation from said guide ring; a plurality of elongate arms each having one end thereof pivotally secured to said support ring and each having the opposed free ends engaging said guide ring when said support ring is in said position of maximum separation from said guide ring; said drum being radially expandable between collapsed and expanded positions; the diameter of said drum in said collapsed condition being substantially equal to the external diameter of said guide ring, whereby one axial end of said drum forms a shoulder adjacent said guide ring during the period that said drum is in expanded condition.

References Cited in the file of this patent

UNITED STATES PATENTS

| | | |
|---|---|---|
| 2,313,035 | Breth | Mar. 9, 1943 |
| 2,409,974 | Breth et al. | Oct. 22, 1946 |
| 2,443,551 | Beam | June 15, 1948 |
| 2,455,038 | Breth | Nov. 30, 1948 |
| 2,488,863 | Haase | Nov. 22, 1949 |
| 2,503,815 | Frohlich | Apr. 11, 1950 |
| 2,565,071 | Frazier | Aug. 21, 1951 |
| 2,603,581 | Ericson et al. | July 15, 1952 |
| 2,669,281 | Breth | Feb. 16, 1954 |